United States Patent
Wenger et al.

(10) Patent No.: US 8,999,422 B2
(45) Date of Patent: Apr. 7, 2015

(54) PRODUCTION OF ENGINEERED FEED OR FOOD INGREDIENTS BY EXTRUSION

(71) Applicants: LaVon Wenger, Sabetha, KS (US); Marc L. Wenger, Sabetha, KS (US)

(72) Inventors: LaVon Wenger, Sabetha, KS (US); Marc L. Wenger, Sabetha, KS (US)

(73) Assignee: Wenger Manufacturing, Inc., Sabetha, KS (US)

(*) Notice: Subject to any disclaimer, the term of this patent is extended or adjusted under 35 U.S.C. 154(b) by 0 days.

(21) Appl. No.: 13/662,267

(22) Filed: Oct. 26, 2012

(65) Prior Publication Data
US 2014/0087044 A1    Mar. 27, 2014

Related U.S. Application Data

(63) Continuation-in-part of application No. 13/626,644, filed on Sep. 25, 2012, now abandoned.

(51) Int. Cl.
*A23K 1/00* (2006.01)
*A23K 1/18* (2006.01)
*A23L 1/10* (2006.01)
*A23P 1/12* (2006.01)

(52) U.S. Cl.
CPC ............... *A23K 1/1866* (2013.01); *A23K 1/003* (2013.01); *A23L 1/10* (2013.01); *A23P 1/12* (2013.01); *Y10S 426/805* (2013.01)

(58) Field of Classification Search
USPC ......... 426/442, 474, 512, 513, 516, 519, 520, 426/523, 615, 635, 805
See application file for complete search history.

(56) References Cited

U.S. PATENT DOCUMENTS

| | | | |
|---|---|---|---|
| 4,418,086 A * | 11/1983 | Marino et al. ................ 426/302 |
| 5,350,585 A | 9/1994 | Sunderland |
| 5,397,587 A | 3/1995 | Thompson et al. |
| 5,480,673 A | 1/1996 | Rokey |
| 5,620,737 A | 4/1997 | Kazemzadeh |
| 5,840,354 A * | 11/1998 | Baumann et al. ............... 426/74 |
| 6,129,010 A | 10/2000 | Hurd et al. |
| 6,309,682 B1 | 10/2001 | Janot et al. |
| 6,340,487 B1 | 1/2002 | Wenger et al. |
| 6,383,545 B1 | 5/2002 | Huber et al. |

(Continued)

FOREIGN PATENT DOCUMENTS

JP    1281070    11/1989

OTHER PUBLICATIONS

Altan et al. *Development of Extruded Foods by Utilizing Food Industry By-Products*. Ad-vances in Food Extrusion Technolgoy. Ed. Medeni Maskan and Aylin Altan. New York:CRC Press, 2011. 121-167.

(Continued)

*Primary Examiner* — Drew Becker
*Assistant Examiner* — Preston Smith
(74) *Attorney, Agent, or Firm* — Hovey Williams LLP

(57) ABSTRACT

Improved processes for the production of engineered feed or food ingredients by extrusion comprise the steps of directing a dry fraction and a byproduct slurry fraction in serial order through a preconditioner and twin-screw extruder in order to create a wet extrudate, which is thereafter dried. The dry fraction is selected from sources of plant-derived starch and/or protein, sources of animal-derived functional proteins, and mixtures thereof. The slurry fraction comprises aqueous byproduct slurries from meat, dairy, vegetable, and fruit processing. The extrusion processes yield high-quality ingredients without the need for conventional rendering.

20 Claims, 6 Drawing Sheets

(56) References Cited

U.S. PATENT DOCUMENTS

| | | | |
|---|---|---|---|
| 6,387,429 | B1 | 5/2002 | Huber et al. |
| 6,465,029 | B2 | 10/2002 | Wenger et al. |
| 6,773,739 | B2 | 8/2004 | Hauck et al. |
| 7,226,778 | B2 | 6/2007 | Darling et al. |
| 7,654,813 | B1 | 2/2010 | Kearns et al. |
| 7,794,134 | B1 | 9/2010 | Henry |
| 7,811,617 | B1 | 10/2010 | Wenger et al. |
| 7,887,870 | B2 | 2/2011 | McMindes et al. |
| 7,906,166 | B2 | 3/2011 | Wenger et al. |
| 8,177,414 | B1 | 5/2012 | Wenger |
| 2005/0214419 | A1 | 9/2005 | Aberle et al. |
| 2006/0188641 | A1* | 8/2006 | Baumer et al. .......... 426/656 |
| 2006/0188642 | A1 | 8/2006 | Yakubu et al. |
| 2007/0237022 | A1 | 10/2007 | Wiltz et al. |
| 2010/0092643 | A1 | 4/2010 | Hertzel et al. |
| 2012/0171346 | A1 | 7/2012 | Plattner et al. |
| 2012/0207904 | A1 | 8/2012 | Twombly et al. |

OTHER PUBLICATIONS

Altan et al. *Twin-screw extrusion of barley-grape pomace blends: Extrudate characteristics and determination of optimum processing conditions*. Journal of Food Engineering, 89:1 (2008): 24-32.

Bampidis et al. *Citrus by-products as ruminant feeds: A review*. Animal Feed Science and Technology, 128 (2006) 175-217.

Fallahi et al. *Twin-screw Extrusion Processing of Vegetable-based Protein Feeds for Yellow Perch (Perca flavescens) Containing Distillers Dried Grains, Soy Protein Concentrate, and Fermented High Protein Soybean Meal.*. Journal of Food Research 1 (2012): 230-246.

* cited by examiner

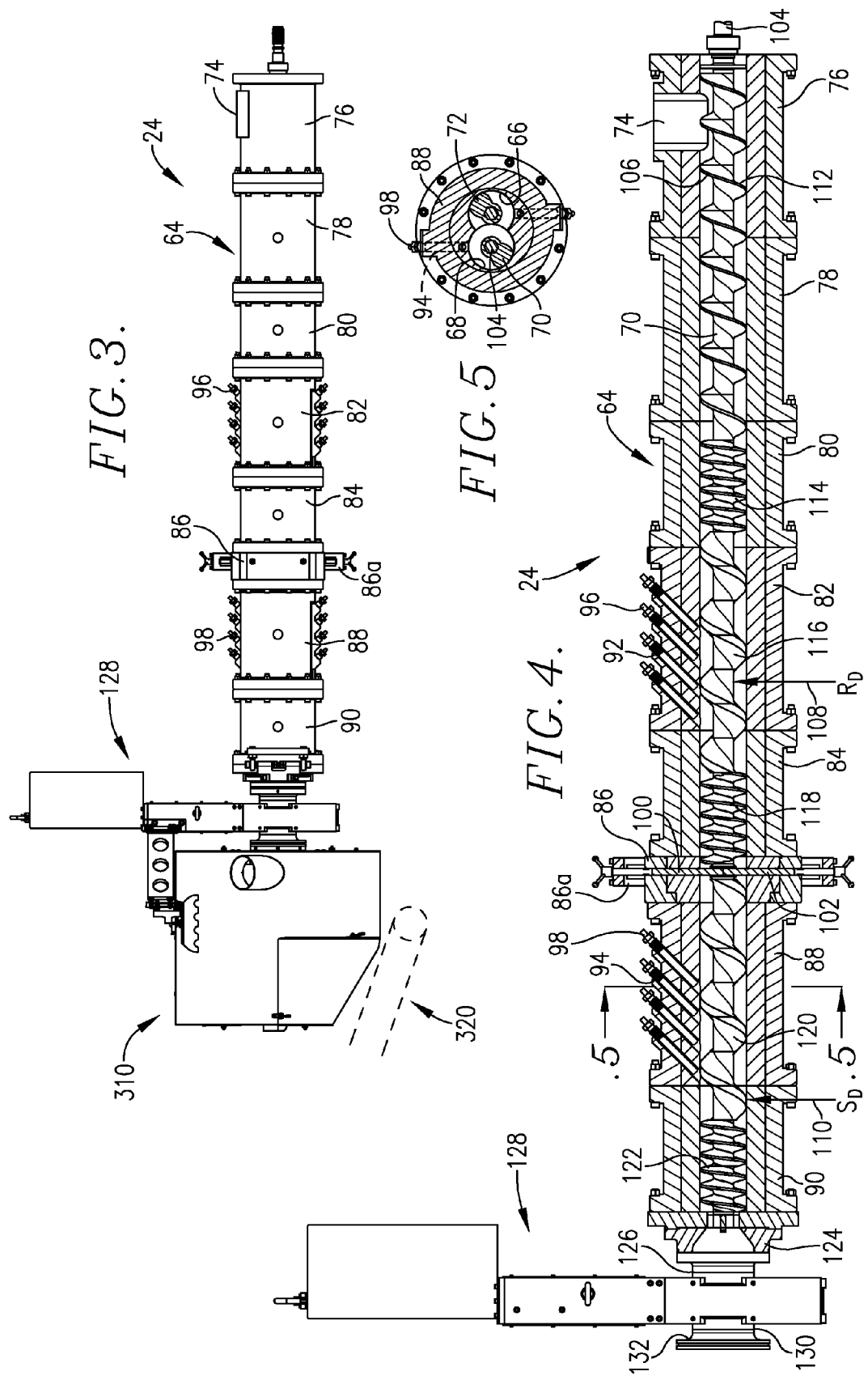

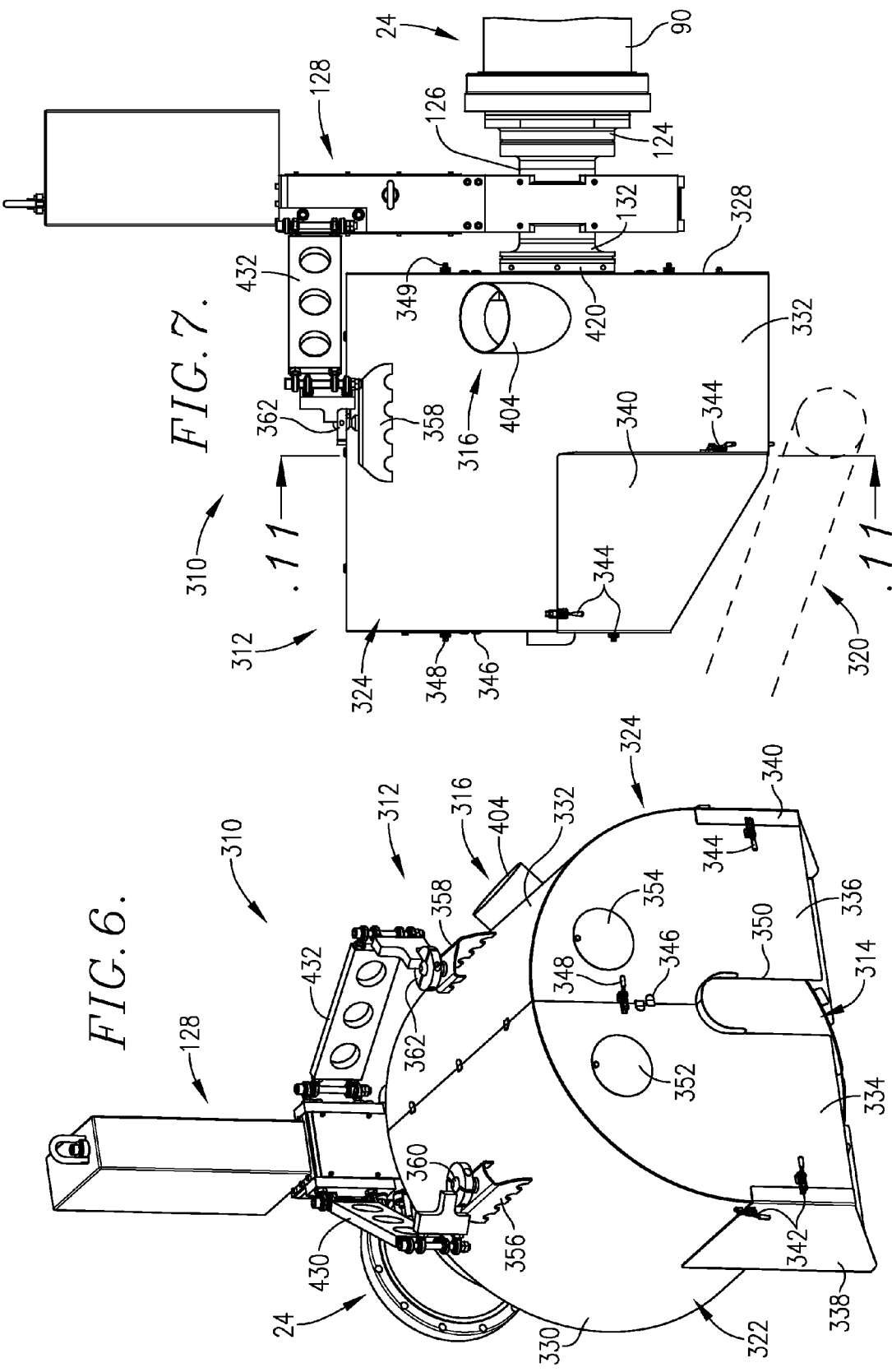

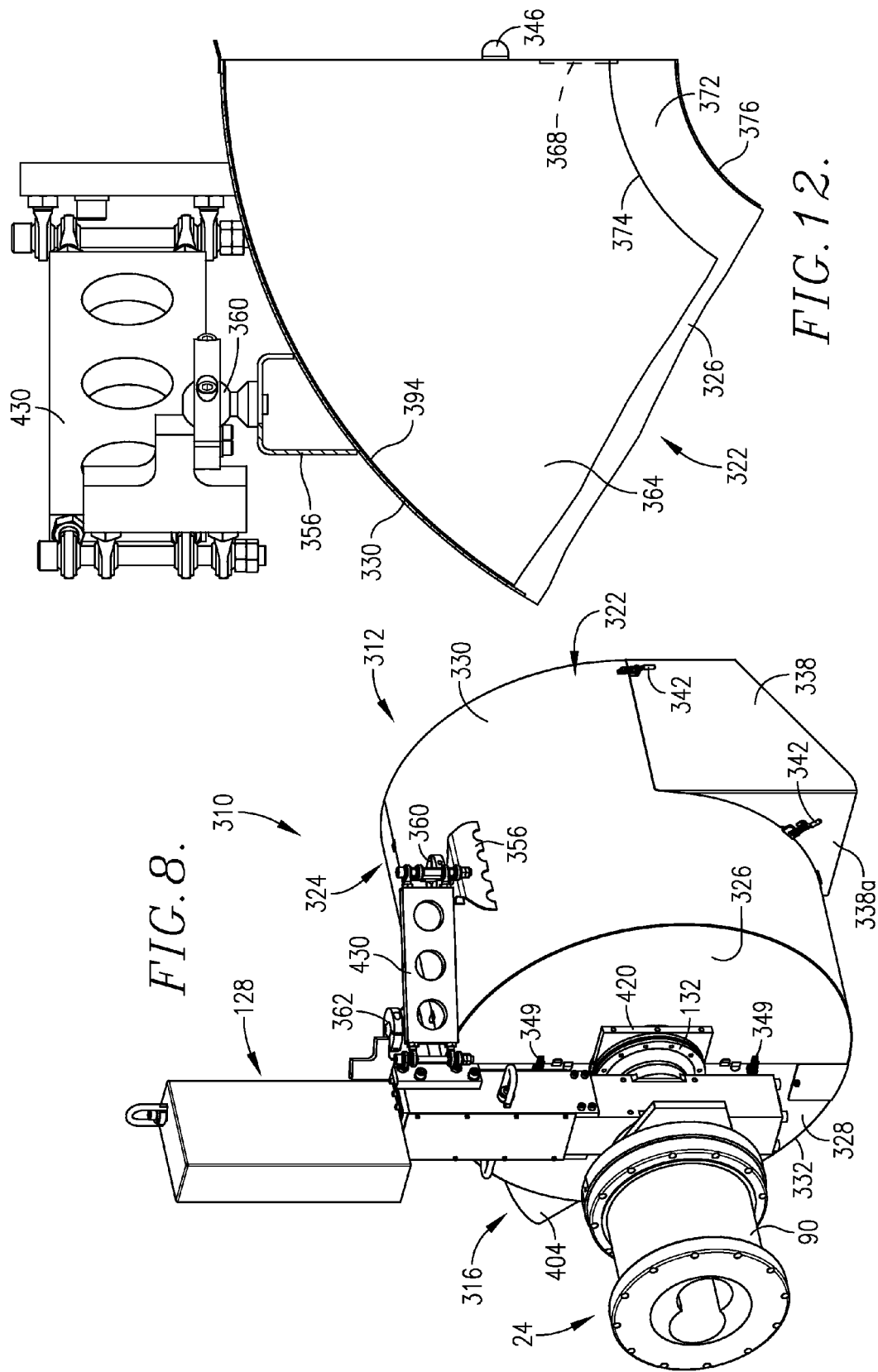

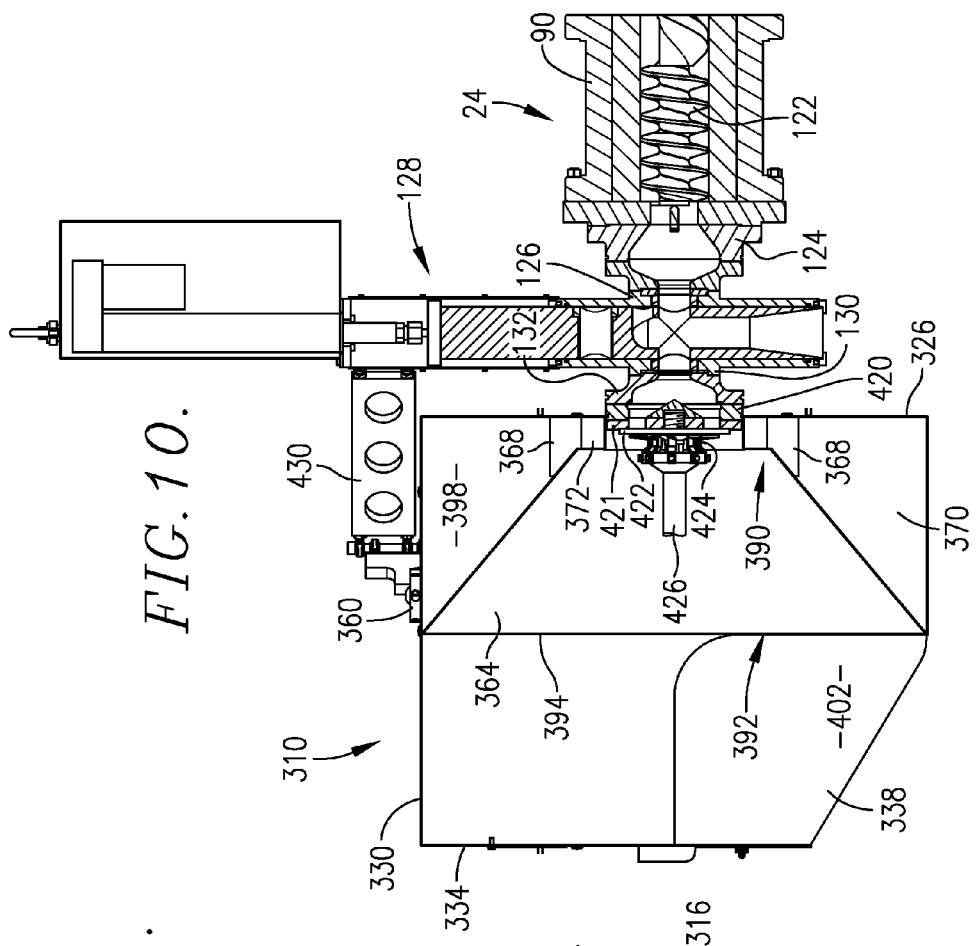

PRODUCTION OF ENGINEERED FEED OR FOOD INGREDIENTS BY EXTRUSION

CROSS-REFERENCE TO RELATED APPLICATION

This application is a continuation-in-part of U.S. patent application Ser. No. 13/626,644, filed Sep. 25, 2012, which is incorporated herein by reference in its entirety.

BACKGROUND OF THE INVENTION

1. Field of the Invention

The present invention is broadly concerned with improved extrusion processes for producing engineered ingredients designed for incorporation into animal feeds or human foods. More particularly, the invention is concerned with such processes wherein separate dry and byproduct slurry fractions are initially preconditioned, followed by extrusion thereof and final drying to obtain the engineered ingredients, which may be used in lieu of conventional meat or plant-based meals heretofore produced in rendering plants.

2. Description of the Prior Art

Animal- and plant-derived byproducts, such as waste materials from slaughterhouses, supermarkets, butcher shops, restaurants, feed lots, ranches, dairies, are commonly processed in rendering plants. In such facilities, the incoming byproduct or waste materials are finely chopped and heated, either continuously or on a batch basis, which separates fats and removes water to create concentrated products. After cooking, the materials are typically screened and then dried, to create finely divided meals. The rendering process kills bacteria, viruses, parasites, and other organisms. However, owing to the generally unsanitary conditions within rendering plants, the final meal products are prone to re-contamination after fabrication thereof. Generally speaking, meat meals produced in rendering plants contain around 50-85% crude protein, 1-15% crude fat, 1-4% crude ash, and have a moisture content of 7-10% by weight.

Rendering plants can present significant environmental problems and are energy-intensive to operate. For example, the handling and processing of organic and raw materials produces significant amounts of undesirable, biodegradable elements which can lead to water and air pollution. Effective control of these problems requires sophisticated treatment processes and control equipment (e.g., water and air emission systems), which require significant capital and plant-operating costs.

For all of these reasons, in recent years the cost of rendered ingredients designed for incorporation into animal feeds, such as meals of meat, bone, fish, and blood, have increased significantly. Moreover, in certain cases, the availability of such ingredients has become problematic.

Extrusion processing is a well-established science and generally involves initially preconditioning starting ingredients to moisturize and at least partially cook the ingredients, followed by passage of the preconditioned material into and through an elongated barrel equipped with helically flighted extrusion screw(s) and an endmost, restricted orifice die. In the extruder, the material is subjected to increasing levels of heat, pressure, and shear, in order to cook the material to the desired extent. The extrudate issuing from the die is typically cut by a rotating knife to provide a chunk-type product. Extrusion technology is widely used in the production of pet and human foods.

A limitation upon extrusion processing has been that high-moisture starting products are difficult or impossible to extrude. For example, in prior practice, it has been difficult to successfully extrude starting materials having moisture contents above about 40% by weight.

SUMMARY OF THE INVENTION

The present invention overcomes the problems outlined above and provides methods of preparing a food or feed ingredients for incorporation into a human foods or animal feeds, while reducing or eliminating the need for plant rendering. The methods broadly comprise the steps of extruding an extrudable mixture comprising a dry fraction and a byproduct slurry fraction from a twin-screw extruder to create a wet extrudate, and thereafter drying the wet extrudate to give the desired food or feed ingredient. The preferred extruding step includes the steps of first directing at least a portion of the dry fraction and at least a portion of the byproduct slurry fraction together through a preconditioner for at least partial cooking of the solids therein, whereupon the preconditioned fraction portions are directed to the barrel of a twin-screw extruder. The extrudable mixture is formed in the barrel, which may be the preconditioned materials alone, or with the addition of a further dry fraction portion and/or a byproduct slurry fraction portion. Generally speaking, it is preferred to precondition all of the dry fraction, so that any additions to the extruder barrel are made up of an additional byproduct slurry fraction.

The dry fraction includes one or more ingredients selected from the group consisting of a source of plant-derived starch, a source of plant-derived protein, a source of animal-derived functional protein, and mixtures thereof, whereas the byproduct slurry fraction is selected from the group consisting of byproduct slurries from meat (including poultry), vegetable, and fruit processing, and mixtures thereof, the slurry fraction being an aqueous blend containing byproduct solids and from about 40-95% by weight water. The extrudable mixture within the extruder barrel, comprising the complete dry fraction and the complete byproduct slurry fraction, is constituted so that the extrudable mixture contains from about 70-215% by weight of the total slurry fraction (i.e., both the solids and liquids), where the total weight of the dry fraction is taken as 100% by weight.

A variety of different dry and slurry fractions may be used in the invention, depending on economic considerations and the availability of starting ingredients. For example, large industrial-scale poultry processing facilities generate very significant amounts of mechanically deboned poultry, feathers, and poultry pieces. All of these may be processed in accordance with the invention to yield human food or animal feed ingredients without the need for shipping these products to a rendering plant for treatment. Thus, the poultry producer has sources of saleable high-quality animal feed ingredients without the expense associated with rendering.

BRIEF DESCRIPTION OF THE DRAWINGS

FIG. 3 is a side elevational view of a preferred twin-screw extruder used in the preparation of the engineered ingredients of the invention, in combination with a dispersal hood assembly;

FIG. 4 is a vertical sectional view illustrating the internal construction of the preferred extruder;

FIG. 5 is a vertical sectional view taken along the line 5-5 of FIG. 4 and further depicting the construction of the preferred extruder;

FIG. 6 is a front perspective view of a preferred product delivery hood assembly in accordance with the invention;

FIG. 7 is a side elevational view of the hood assembly;

FIG. 8 is a perspective view of the hood assembly, viewing the rear end thereof opposite that illustrated in FIG. 1;

FIG. 10 is a side vertical sectional view of the hood assembly, illustrating the internal components of the assembly;

FIG. 11 is a vertical sectional view taken along line 11-11 of FIG. 7; and

FIG. 12 is an enlarged, fragmentary view partially taken along line 11-11 of FIG. 7, and further illustrating the details of construction of the hood assembly.

DETAILED DESCRIPTION OF THE PREFERRED EMBODIMENT

Figures 1, 2:
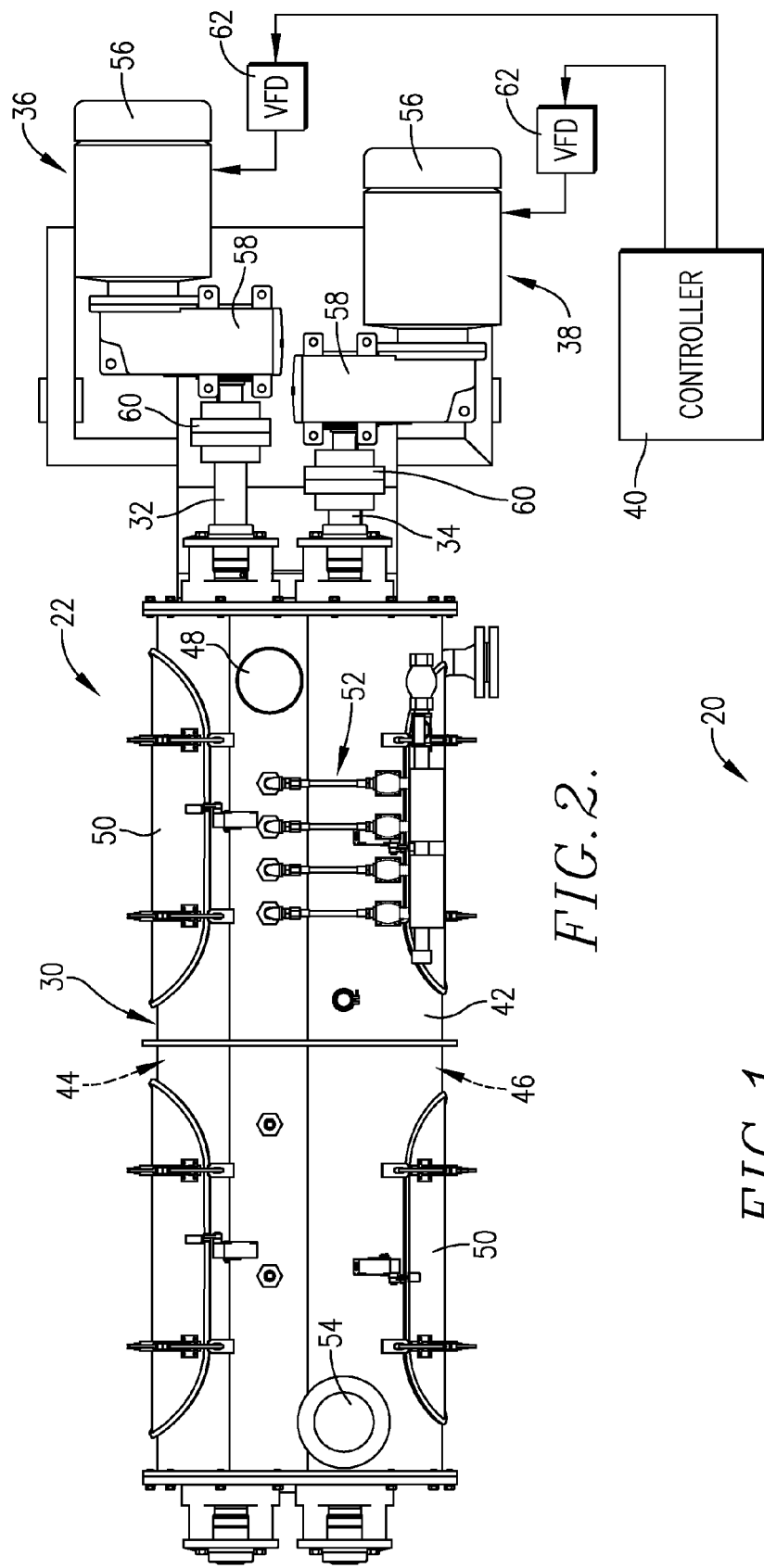
FIG. 1 is a schematic representation of the preferred apparatus for producing the engineered ingredients of the present invention.
FIG. 2 is a plan view of the preferred preconditioner used in the preparation of the engineered ingredients of the invention, with the control apparatus for the preconditioner being schematically depicted.

Turning now to the drawings, and particularly FIGS. 1-2 and 4-5, the overall extrusion system 20 broadly includes a preconditioner 22, an extruder 24, a predryer 26, and a primary dryer 28. Starting materials for the engineered ingredients are passed in serial order through the components 22-28 to produce the desired extrudates. These components will be separately described below.

The Preconditioner

The preconditioner 22 is of the type illustrated and described in U.S. Pat. No. 7,906,166, incorporated by reference herein in its entirety. Specifically, the preconditioner 22 includes an elongated mixing vessel 30 with a pair of parallel, elongated, axially extending shafts 32 and 34 within and extending along the length of the vessel 30. The shafts 32, 34 are operably coupled with individual variable drive devices 36 and 38, the latter in turn connected with a digital control device 40.

The vessel 30 has an elongated, transversely arcuate sidewall 42 presenting a pair of elongated, juxtaposed, interconnected internal chambers 44, 46, as well as a material inlet 48, and a preconditioned material outlet (not shown) at the end thereof remote from inlet 48. The chamber 46 has a larger cross-sectional area than the adjacent chamber 44. The sidewall 42 has access doors 50 and is also equipped with steam injection apparatus 52 for injection of water and/or steam into the confines of vessel 30 during use of the preconditioner, and a vapor outlet 54.

Each of the shafts 32, 34 has a plurality of radially outwardly extending mixing elements (not shown) which are designed to agitate and mix material fed to the preconditioner, and to convey the material from inlet 48 toward and out the vessel outlet. The mixing elements secured to the shafts are relatively axially offset and are intercalated (i.e., the elements of each shaft extend into the cylindrical operational envelope presented by the other shaft and mixing elements). The mixing elements may be mounted in a substantially perpendicular relationship to the associated shafts, but are preferably adjustable both in length and pitch. The preferred mixing elements are of paddle-like construction, having a shank secured to the associated shaft, with a generally flat, outboard portion of increased width.

The drives 36 and 38 are identical in terms of hardware, and each includes a drive motor 56, a gear reducer 58, and a coupler 60 serving to interconnect the corresponding gear reducer 58 and motor 56 with a shaft 32 or 34. The drives 36 and 38 also preferably have a variable frequency drive 62, which is designed to permit selective, individual rotation of the shafts 32, 34, in terms of speed and/or rotational direction independently of each other. In order to provide appropriate control for the drives 36 and 38, the variable frequency drives 62 are each coupled with a corresponding motor 56 and the control device 40. The latter may be a controller, processor, application-specific integrated circuit (ASIC), or any other type of digital or analog device capable of executing logical instructions. The device may even be a personal or server computer, such as those manufactured and sold by Dell, Hewlett-Packard, Gateway, or any other computer manufacturer, network computers running Windows NT, Novell Netware, Unix, or any other network operating system. The drives 56 may be programmed as desired to achieve the ends of the invention, e.g., they may be configured for different rotational speed ranges, rotational directions, and power ratings.

In preferred forms, the preconditioner 22 is supported on a weighing device such as load cells (not shown), which are also operatively coupled with controller 40. The use of such load cells permits rapid, on-the-go variation in the retention time of material passing through vessel 30, as described in detail in U.S. Pat. No. 6,465,029, incorporated by reference herein.

The use of the preferred variable frequency drive mechanisms 36, 38 and control device 40 allow high-speed adjustments of the rotational speeds of the shafts 32, 34 to achieve desired preconditioning while avoiding any collision between intermeshing mixing elements. In general, the control device 40 and the coupled drives 62 communicate with each drive motor 56 to control the shaft speeds. Additionally, the shafts 32, 34 can be rotated in different or the same rotational directions at the discretion of the operator.

Retention times for material passing through preconditioner 22 can be controlled manually be adjusting shaft speed and/or direction, or, more preferably, automatically through control device 40. Weight information from the load cells is directed to control device 40, which in turn makes shaft speed and/or directional changes based upon a desired retention time.

Preconditioners of the type described are presently being commercialized by Wenger Manufacturing, Inc. of Sabetha, Kans., as HIP (high intensity preconditioners) devices.

The Extruder

The extruder 24 includes an elongated, tubular, multiple-section barrel 64 presenting juxtaposed, intercommunicated chambers or bores 66, 68, and a pair of elongated, helically flighted, axially rotatable, juxtaposed, intercalated screws 70, 72 within the bores 66, 68. The barrel 64 includes an inlet 74 which communicates with the bores 66, 68. Although not shown, the screws 70, 72 are operably coupled with a drive assembly for axial rotation of the screws, which typically includes a drive motor and a gear reduction assembly.

In more detail, the barrel 64 includes, from right to left in FIG. 4, a series of tubular sections connected end-to-end by conventional bolts or other fasteners. Specifically, the barrel 64 has inlet and initial conveying heads 76 and 78, a first steam restriction head 80, a first steam injection head 82, a second steam restriction head 84, an adjustable mid-barrel valve assembly head 86, a second steam injection head 88, and a third steam restriction head 90. As illustrated, each of the heads 76-84 and 88-90 is equipped with conventional endmost, radially enlarged connection flanges, and all of the heads have aligned through bores which cooperatively form the overall barrel bores 66 and 68.

The heads 82 and 88 are equipped with two series of steam injection ports 92, 94, wherein each of the ports houses an elongated steam injector 96, 98. The two series of ports 92, 94 are located so as to respectively communicate with the bores 66, 68 through the heads 82, 88. The ports 92, 94 are oriented at oblique angles relative to the longitudinal axes of the corresponding bores 66, 68.

The head 86 supports an adjustable valve assembly 86a of the type described in U.S. Patent Publication No. US 2007/0237022, incorporated by reference herein in its entirety. Briefly, the assembly 86a includes opposed, slidable, flow restriction components 100, 102, which can be selectively shifted toward and away from the central shafts of the screws 70, 72 so as to vary the restriction upon material flow and thus increase or decrease pressure and shear within the extruder 24.

The screws 70, 72 are identical to each other and thus only one of the screws need be described in detail. The overall screw 70 broadly includes a central shaft 104 with helical flighting 106 projecting outwardly from the shaft 104. However, the screw 70 is specially designed and has a number of novel features. These features are best described by a consideration of certain geometrical features of the screw 70 and its relationship to the associated bores 66, 68. In particular, the shaft 104 has a root diameter $R_D$ indicated by the arrow 108 of FIG. 4, as well as an outermost screw diameter $S_D$ defined by the screw flighting 106 and illustrated by the arrow 110. In preferred practice, the ratio $S_D/R_D$ of the outermost screw diameter to the root diameter is from about 1.9-2.5, and most preferably about 2.35.

The individual sections of screw flighting 106 also have different pitch lengths along the screw 70, which are important for reasons described below. Additionally, along certain sections of screw 70, there are different free volumes within the bore 68, i.e., the total bore volume in a section less the volume occupied by the screw within that section differs along the length of screw 70.

In greater detail, the screw 70 includes an inlet and initial feed section 112 within heads 76 and 78, a first shorter pitch length section 114 within head 80, a first longer pitch length section 116 within head 82, a second short pitch length section 118 within head 84, a second longer pitch length section 120 within head 88, and a third short pitch length section 122 within head 90. In preferred practice, the pitch lengths of screw sections 114, 118, and 122 range from about 0.25-1.0 screw diameters, and are most preferably about 0.33 screw diameters. The pitch lengths of screw sections 112, 116, and 120 range from about 1-2 screw diameters, more preferably about 1.5 screw diameters.

These geometrical features are important and permit incorporation of greater quantities of steam into the material passing through the extruder 24. In essence, the restriction heads, 80, 84, and 90, together with the short pitch length screw sections 114, 118, and 122, cooperatively create steam restriction zones which inhibit the passage of injected steam past these zones. As such, the zones are a form of steam locks. Additionally, provision of the heads 82 and 88 with the longer pitch length screw sections 116 and 120 therein create steam injection zones allowing injection of greater quantities of steam than heretofore conventional. The longer pitch length screw sections also result in decreased barrel fill and thus create steam injection zones. Finally, the orientation of the injection ports 92 and 94, and the corresponding injectors 96, 98, further enhances the incorporation of steam into the material passing through extruder 10.

The outlet end of extruder barrel 64 is equipped with a transition 124, which is secured to the end of head 90 and to the inlet 126 of a back pressure valve assembly 128. The assembly 128 is essentially conventional, and is designed to provide a selective degree of restriction to flow of material from extruder barrel 64. The valve assembly 128 is illustrated and described in U.S. Pat. No. 6,773,739, wherein the portions thereof directed to the back pressure valve assembly 114 are incorporated by reference herein in their entireties. The outlet 130 of the assembly 128 is operably coupled with a transition 132.

The Drying Assembly (Predryer 26 and Primary Dryer 28)

The engineered ingredient products of the invention are normally in a very wet condition as extruded. Accordingly, it has been found that the as-extruded product is preferably subjected to pre-drying in a relatively small three-pass dryer in order to reduce the moisture content of the extrudate to a level more suitable for a large, more primary dryer. For example, the wet extrudate may have a moisture content of from about 32-50% by weight, based upon the total weight of the extrudate taken as 100% by weight, and a density of from about 500-700 kg/m$^3$, and pre-drying will reduce the moisture content by from about 5-15% by weight. Pre-drying is preferably carried out at a temperature of from about 10-180° C. for a period of from about 1-6 minutes.

After pre-drying, the product is directly fed into a primary dryer 28 where the product is finally dried to a moisture level of from about 7-11% by weight, based upon the total weight of the dried extrudate taken as 100% by weight. The conditions within the primary dryer are a temperature of from about 80-160° C., and a residence time period of from about 12-40 minutes.

The Dispersal Hood Assembly

During the course of development of the present invention, it was found that the wet as-extruded product had a significant tendency toward agglomeration as it emerged from the extruder and/or on conveyor belts typically used as take-away devices. Accordingly, it was found necessary to design a dispersal hood mounted adjacent the outlet or die end of extruder 24 in order to overcome the agglomeration problem.

Turning to the drawings, a product-spreading dispersal hood assembly 310 is illustrated in FIGS. 6-12, and broadly includes an outer housing 312 supporting inner, generally frustoconical deflector 314, and an air delivery assembly 316. The hood assembly 310 is designed for use with devices such as extruders or pellet mills, which are equipped with a die unit to create discrete products; in the exemplary embodiment, the hood assembly 310 is used in conjunction with extruder 24. The purpose of hood assembly 310 is to maintain the discrete products in a separated condition for delivery onto a take-away device, such as an inlet belt 320 of a product predryer 28 (see FIG. 7). In this way, the discrete products are substantially prevented from agglomerating after extrusion and during downstream drying and/or other processing.

The housing 312 is generally semicircular in overall configuration and includes a pair of shiftable housing halves 322 and 324. The halves 322, 324 are largely mirror images of each other, except for the differences described below. Thus, each housing half includes a rear end wall 326, 328, an elongated arcuate sidewall 330, 332, and a forward end wall 334, 336. The sidewalls 330, 332 have detachable, somewhat U-shaped forward panels 338, 340 secured to the sidewalls 330 and 332 by latches 342, 344. Each such panel has an inwardly extending wall segment 338a, 340a, each having an arcuate inner margin which abuts the adjacent sidewall 330 or 332. The halves 322, 324 cooperatively define the complete overall housing 312 when the walls are placed in adjacency, as illustrated in FIG. 6. In order to ensure proper attachment between the halves 322, 324, the pair of alignment tabs 346 are provided on the butt edges of the front end walls 334, 336, and a fore and aft latches 348 and 349 are provided to interconnect the halves. As depicted in FIG. 6, the front end walls 334, 336 are cooperatively designed to provide a knife drive opening 350, which is important for purposes to be described, and are also equipped with observation ports 352, 354. A bracket 356, 358 is secured to the outer surface of each sidewall 330, 332 and supports a spherical mount 360, 362.

Figures 9, 10A:
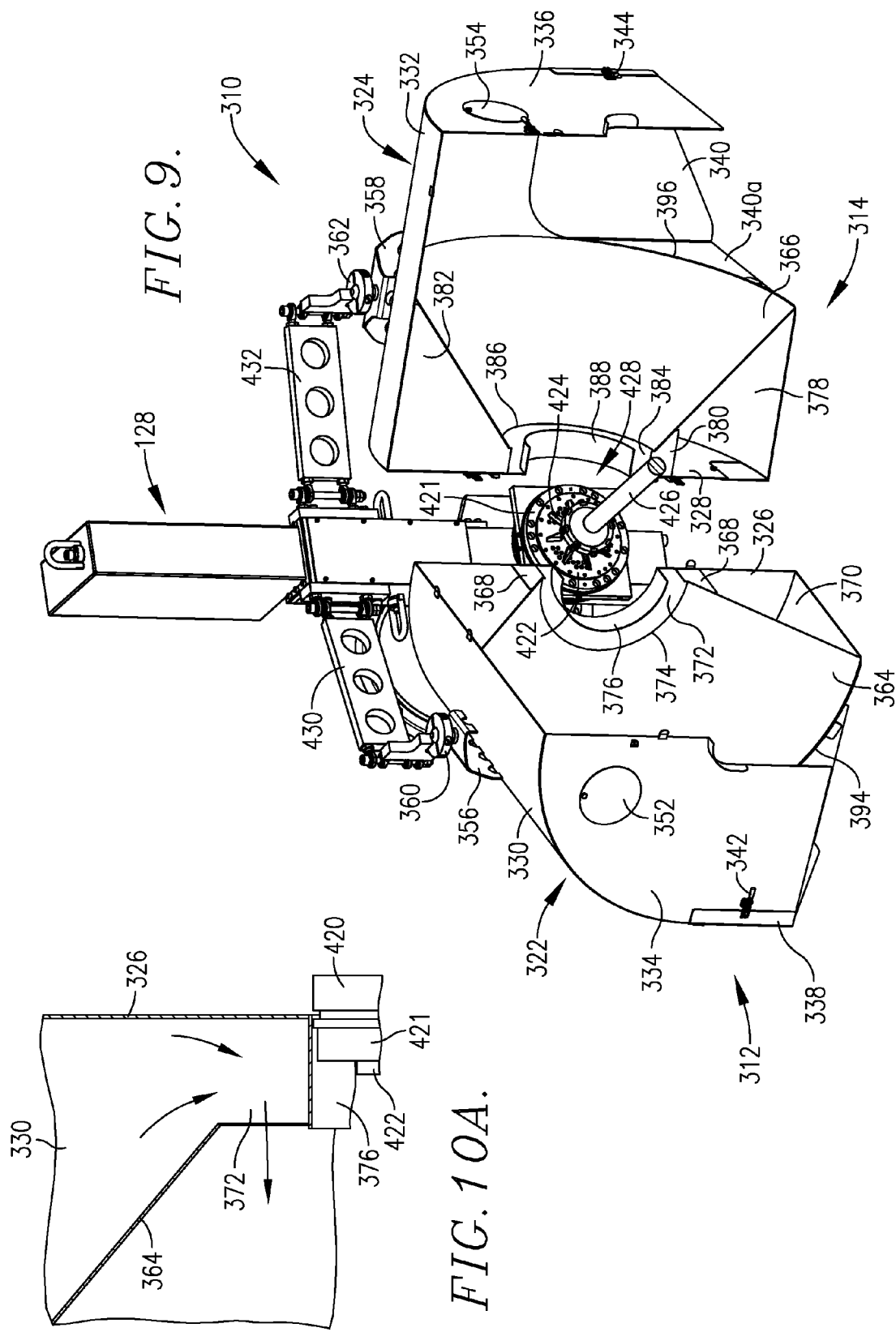
FIG. 9 is a front perspective view similar to that of FIG. 6, but illustrating the hood in its opened position permitting access to the extruder die and knife assembly.
FIG. 10A is an enlarged, fragmentary view illustrating the airflow path within the hood assembly.

The deflector 314 is made up of two largely mirror image, half-frustoconical walls 364, 366, with each wall being secured to and extending along the length of a corresponding housing half 322, 324 so that, when the halves 322 and 324 are closed together, the walls 364, 366 cooperatively define the substantially frustoconical deflector 14. As illustrated in FIGS. 9 and 10, the wall 364 is welded or otherwise affixed to the inner surface of sidewall 330, and is further supported by means of tabs 368 secured to rear end wall 326. As such, it will be observed that a semicircular, generally triangular in cross-section, open-ended airway 370 is defined between the outer surface of wall 364, the inner surface of sidewall 330, and the inner surface of end wall 326. A semicircular air outlet 372 is in communication with airway 370 and is defined between the inboard margin 374 of wall 364 and a semicircular collar 376, the latter being secured to and extending forwardly from rear end wall 326.

The frustoconical wall 366 is likewise secured to the inner surface of housing sidewall 332, thereby also defining a semicircular, generally triangular in cross-section airway 378 between the outer surface of wall 366, the inner surface of sidewall 332, and the inner surface of end wall 328. A lower tab 380 provides further support for the wall 366. However, at the upper end of the airway 378, a somewhat triangular panel 382 is provided which closes the upper end of airway 378. A semicircular air outlet 384 in communication with airway 378 is defined between the inner margin 386 of wall 366 and a semicircular collar 388 affixed to end wall 328.

It will be appreciated that when the halves 322, 324 are closed against each other and latched together, the abutting walls 364, 366 define the substantially frustoconical deflector 314 having a relatively small product inlet opening 390 defined by the abutting collars 376 and 388; a relatively large deflector product outlet opening 392 in spaced and opposed relationship to the opening 390 and defined by the outer margins 394, 396 of the walls 364, 366; an essentially full-circle airway 398 defined by the aligned airways 370 and 378; a circular air outlet 400 defined by the now-aligned outlets 372 and 384 in communication with airway 398; and that the sidewalls 364 and 366 forward of the outer margins 394, 396, the front walls 334, 336, and the panels 338, 340 cooperatively provide a an elongated, laterally extending, open-bottom product confinement zone 402.

The air delivery assembly 316 is designed to supply airway 398 with pressurized air, and to direct such air through the outlet 400 in a direction towards the outlet opening 392 of deflector 314. To this end, an air inlet pipe 404 is secured to sidewall 332 and is designed to receive an air conduit (not shown), supplying pressurized air for passage through airway 398 and outlet 400.

The extruder 24 in the illustrated embodiment further includes a square spacer 420 with an annular extension which mates with a die plate support 421; the latter in turn supports a restricted orifice die plate 422 having a plurality of die openings therethrough.

A multiple-blade rotary cutoff knife 424 is positioned against the outer face of die plate 422, and is secured to a knife shaft 426. The shaft 426 extends through the shaft opening 350 and is coupled with a conventional motor drive (not shown). It will thus be appreciated that the die plate 422 and knife 424 provide a die unit 428, which, with the overall extruder 24, provides discrete cut extrudate products.

In order to further support the housing halves 322, 324 during swinging movement thereof, a pair of hinged support arms 430, 432 are operatively connected between the back pressure valve assembly 128 and the respective spherical mounts 360, 362. In this manner, the halves 322, 324 may be easily swung between the closed position of FIG. 6 and the open, access position of FIG. 94.

In the operation of hood assembly 310, the use of air delivery assembly 316 is optional, i.e., with some products, it is unnecessary to provide air currents surrounding the die unit 428.

In other instances, the air delivery assembly 316 facilitates separation of the cut extrudate. When used, the assembly 316 may be operated at a velocity of up to about 6,000 cubic feet/minute (cfm), more usually from about 2,000-4,000 cfm, and most typically about 3,000 cfm. The air may be ambient temperature air or heated to a temperature of up to about 80° C. Ambient air is preferred for reasons of cost, and also because ambient air helps to "set" the surface of the extrudates to reduce stickiness. In any case, use of the assembly 316 also helps deflect the extrudates so that they strike the deflector 314 at a lower angle, thereby reducing the probability of agglomeration on the side of the deflector.

While the invention has been described in the context of the twin-screw extruder 18, the invention is not so limited. That is, a single screw extruder could also be used or, for that matter, any other processing device, such as a pellet mill which will generate cut extrudate products. Moreover, while the support arms 430, 432 have been shown as mounted on the back pressure valve 414 assembly, this is a matter of convenience only, and such support arms, where used, may be supported on any other convenient portion of the overall apparatus.

Methods of Producing Engineered Feed or Food Ingredients

In preferred practice, the equipment described above is used for producing the engineered products of the invention. Generally speaking, the method involves directing at least a portion of a complete dry fraction and at least a portion of a byproduct slurry fraction through the preconditioner, followed by directing the preconditioned materials into the twin-screw extruder. A complete extrudable mixture is formed within the extruder barrel, comprising the preconditioned materials and any supplemental portions of the dry and/or byproduct slurry materials. The extrudable mixture is then passed through the extruder to create a wet extrudate, which is then dried.

The complete dry fraction includes one or more ingredients, such as plant-derived starch, plant-derived protein, and an animal-derived functional protein, or mixtures thereof. The complete byproduct slurry fraction includes one or more byproduct slurries from meat, vegetable, and fruit processing, and mixtures thereof. The extrudable mixture comprises the complete dry and byproduct slurry fractions, with the extrudable mixture containing from about 70-215% by weight of the total byproduct slurry fraction (more preferably from about 85-200% by weight thereof), where the total weight of the dry fraction is taken as 100% by weight.

In preferred practice, dry and byproduct slurry portions are initially added individually to the preconditioner for mixing therein. This is done because some of the dry:byproduct slurry ratios could result in semi-solid or very viscous, sticky masses if they are premixed prior to preconditioning. Such masses may be too viscous to be pumped or too fluid to be fed to the preconditioner using normal screw-type metering devices. Moreover, individual addition of dry and byproduct slurry ingredients allows process flexibility, meaning that the dry:byproduct slurry ratios may be quickly varied as the need arises. Finally, such individual addition allows each type of ingredient to be added to the preconditioner at optimum temperatures for handling and metering.

The dry fraction preferably contains a source of plant-derived starch, e.g., a source of starch selected from the group consisting of sources of potato, corn, pea, bean, wheat, rice, oat, arrowroot, tapioca, sorghum, barley, rye, and yam starches, and mixtures thereof. The plant-derived protein is usually selected from the group consisting of sources of soy, legumes, nuts, mung bean, pumpkin, asparagus, cauliflower, spinach, broccoli, and quinoa, and mixtures thereof. The dry fraction may also include, or be wholly, a source of animal-derived functional protein. It will be appreciated that the dry fraction is normally not absolutely bone-dry, but will usually contain native water within the ingredients thereof; generally, the dry fraction will have up to about 12-15% by weight native moisture therein.

As used herein, "functional protein" refers to animal proteins which have not been substantially denatured and are therefore at least partially (e.g., at least about 40%) water soluble. Such proteins contribute to binding and expansion of the overall mixture during extrusion thereof, owing to the visco-elastic properties of the functional proteins.

In many instances, the entirety of the dry and byproduct slurry fractions are added to the preconditioner. As noted above, in some cases only incomplete portions of the dry and/or byproduct slurry fractions are added to the preconditioner, with the balance thereof being added directly to the extruder barrel to thereby create the complete extrudable mixture within the extruder. Generally, it is preferred that the total dry fraction is added to the preconditioner to ensure adequate cooking of the dry fraction ingredients prior to extrusion.

The complete byproduct slurry fraction is generally an aqueous blend having a solids content of from about 5-60% by weight, more preferably from about 15-50% by weight, with an aqueous fraction of from about 40-95% by weight, more preferably from about 50-85% by weight water. The solids fraction is primarily made up of the solids of interest, e.g., meat, poultry, dairy, vegetable and fruit processing solids, as well as incidental ingredients, e.g., fats and ash.

Meat byproduct slurries are preferably byproduct slurries of mechanically separated or deboned meats (e.g., poultry, beef, pork, fish, sheep, venison, and mixtures thereof), and animal parts or derivatives thereof such a feathers, bones, and blood. The composition of meat byproduct slurries varies depending on prior processing, source, meat species, and meat parts included, and generally have from about 55-80% by weight water (usually about 70% water), a pH of from about 3.5-7 (more preferably about 6.5), from about 4-25% by weight protein (more preferably from about 13-17% by weight protein), and from about 4-25% by weight fat (more preferably from about 10-14% by weight fat).

Dairy and poultry byproduct slurries are usually selected from the group consisting of byproduct slurries of milk, cream, eggs, poultry and poultry derivatives, and mixtures thereof. Such dairy and poultry byproduct slurries generally have from about 50-98% by weight water, a pH of from about 3.5-7, from about 2-40% by weight protein, and from about 2-40% by weight fat.

Vegetable byproduct slurries are usually selected from the group consisting of potato, beet, corn, pea, bean, wheat, rice, oat, sorghum, barley, rye, yam, and mixtures thereof. Fruit byproduct slurries are normally selected from the group consisting of apple, apricot, avocado, banana, berries, cherry, cranberry, grape, grapefruit, lemon, lime, melons, citrus fruits, tomato, peach, pear, pineapple, plum, and mixtures thereof. Fruit and vegetable slurries generally have from about 60-95% by weight water, a pH of from about 3-6.8, from about 1-20% protein, from about 0-12% by weight fat, and from about 1-40% by weight fiber.

In terms of gross analysis, the extrudable mixtures of the invention, comprising the complete dry fraction and complete byproduct slurry fraction, include from about 50-80% by weight solids (more preferably from about 60-70% by weight) and from about 20-50% by weight water (more preferably from about 30-40% by weight). The solids content of the extrudable mixtures may contain from 0-100% by weight vegetable and/or meat protein, and from about 0-100% by weight starch, i.e., the solids content of the extrudable mixtures may be entirely protein or entirely starch. However, in preferred practice, the extrudable mixtures comprise from about 20-95% protein and correspondingly from about 5-20% starch. Other incidental ingredients derived from the dry and slurry fractions may also be present in the extrudable mixtures. It will be appreciated that the byproduct slurry fractions are usually high-moisture slurries received direct from the respective processing operations without drying; however, relatively or completely dry byproduct solids could also be slurried with water and then used in the invention as the byproduct slurry fraction. For example, dried fruit pomaces (e.g., tomato or grape) can be slurried by water addition and used in the invention.

In the preconditioner, the dry and byproduct slurry fraction portions are preconditioned for a period of from about 30 seconds-6 minutes (more preferably from about 60 seconds-4 minutes) and at a temperature of from about 60-110° C. (more preferably from about 70-100° C.). In some cases, steam is injected into the preconditioner.

The preconditioned materials are then fed to the twin-screw extruder where the materials (with possible addition of further portions of the final dry and/or byproduct slurry fractions to the extruder to give the extrudable mixture, including the complete dry and byproduct slurry fractions) are subjected to increasing temperature and shear, followed by passage through a restricted orifice die. During extrusion, the maximum temperature of the extrudable mixture within the barrel is from about 70-180° C. (more preferably about 80-140° C.), and a maximum pressure of from about 340-6, 000 kPa (more preferably from about 2500-4200 kPa). If desired, steam may be injected into the extruder barrel. Residence times of the materials passing through the extruder vary from about 5-60 seconds (more preferably from about 15-40 seconds).

The wet extrudate issuing from the extruder die is normally cut into discrete lengths for ease of downstream handling and shipping. The wet extrudate generally has a moisture content of from about 32-50% by weight (more preferably from about 38-45% by weight), based upon the total weight of the extrudate taken as 100% by weight. This wet extrudate generally has a density of from about 500-700 kg/m$^3$. During the drying step, the wet extrudate is dried to a level of from about 8-12% by weight, more preferably from about 9-11% by weight. In actual practice, it has been found that better drying results are obtained by passing the wet extrudate first through a pre-dryer to reduce the moisture content of the wet extrudate and to set the pre-dried extrudate, followed by subsequent drying to achieve a final weight percent of water. The dried extrudate normally has a protein content of from about 20-80%, more preferably from about 40-65% by weight. Often, the dried extrudate is at least partially expanded owing to passage through the extruder die. A degree of expansion of from about 10-70% is common.

The dried extrudate may be ground to a meal or powder, as dictated by desired end uses. Where the extrudate is formed and sold to an ultimate producer, it is usually shipped as the cut extrudate pieces so that the ultimate producer may then grind the product for use or sale.

EXAMPLES

The following examples set forth preferred techniques for the manufacture of the engineered ingredients of the invention. It is to be understood, however, that these examples are provided by way of illustration only, nothing therein should be taken as a limitation upon the overall scope of the invention.

In a series of extrusion tests, engineered ingredient products in accordance with the invention were prepared using the equipment described above, namely a preconditioner, twin-screw extruder, pre-dryer, and final dryer. The following recipes were used in the extrusion runs, where all percentages are on a by-weight basis, where the total weight of the Dry Ingredient Recipes is taken as 100% by weight, and the total weight of the Slurry Recipes are taken as 100% by weight. In each case, the total of the dry and slurry recipes were individually added to the preconditioner, and the preconditioned materials were fed to the extruder to create the extrudable mixture therein, i.e., there were no supplemental additions of dry or byproduct slurry fractions into the extruder.

Run 1:
  Dry Ingredient Recipe: 27.2% corn, 25% chicken meal, 13.5% beef meal, 8.5% wheat bran, 8.3% soybean meal, 6% beet pulp, 5% barley, and 6.5% minor ingredients (e.g., vitamins, minerals)
  Slurry Recipe: an aqueous slurry of mechanically separated chicken meat containing 70% water
  The slurry was used at a level of 91.6% by weight, based upon the total weight of the Dry Ingredient Recipe taken as 100% by weight.

Run 2:
  Dry Ingredient Recipe: 32% pea flour, 28% potato flour, 22% beet pulp, 14% tapioca starch, 2% salt, and 2% minor ingredients (e.g., vitamins, minerals)
  Slurry Recipe: an aqueous slurry of mechanically separated chicken meat containing 70% water
  The slurry was used at a level of 92.3% by weight, based upon the total weight of the Dry Ingredient Recipe taken as 100% by weight.

Run 3:
  Dry Ingredient Recipe: 32% pea flour, 28% potato flour, 22% beet pulp, 14% tapioca starch, 2% salt, and 2% minor ingredients
  Slurry Recipe: an aqueous slurry of mechanically separated chicken meat containing 70% water
  The slurry was used at a level of 110% by weight, based upon the total weight of the Dry Ingredient Recipe taken as 100% by weight.

Run 4:
  Dry Ingredient Recipe: 32% pea flour, 28% potato flour, 18% wheat middlings, 14% tapioca starch, 2% calcium sulfate, 2% salt, 4% minor ingredients
  Slurry Recipe: an aqueous slurry of pressed meat and other animal protein containing 55% water The slurry was used at a level of 200% by weight, based upon the total weight of the Dry Ingredient Recipe taken as 100% by weight.

The following table sets forth the preconditioning and extrusion information recorded for Runs 1-4:

|  | RUN | | | |
| --- | --- | --- | --- | --- |
|  | 1 | 2 | 3 | 4 |
| Dry Recipe Density kg/m$^3$ | 617 | 617 | — | 612 |
| Dry Recipe Rate kg/hr | 996 | 999 | 1000 | 500 |
| Feed Screw Speed rpm | 19.8 | 17.6 | 15.6 | 9.5 |
| Preconditioner Speed, small shaft rpm | 800 | 800 | 800 | 650 |
| Preconditioner Speed, large shaft rpm | 100 | 100 | 100 | 100 |
| Steam Flow to Preconditioner kg/hr | 40 | 100 | 40 | none |
| Slurry Recipe Rate to Preconditioner kg/hr | 912 | 922 | 1100 | 1000 |
| Preconditioned Product Discharge Temperature ° C. | 79 | 70 | 55 | 65 |
| Preconditioner Discharge Moisture Level % wb | 39.84 | 37.12 | — | 39.98 |
| Extruder Shaft Speed rpm | 600 | 314 | 600 | 625 |
| Extruder Motor Load % | 32 | 52 | 39 | 39 |
| Steam Flow to Extruder kg/hr | 40 | none | none | 13 |
| Water Flow to Extruder kg/hr | none | none | none | none |
| Slurry Recipe Rate to Extruder kg/hr | none | none | none | 250 |
| Temperature Last Head ° C. | 93 | — | — | — |
| Pressure Last Head psig | — | 95 | — | — |
| Extruded Product Discharge Moisture % wb | 39.75 | 36.98 | 44.23 | 42.8 |
| Extruded Product Discharge Density kg/m$^3$ | 569 | 646 | 540 | 534 |

In Run 1, the incoming slurry temperature was 74.3° C., the mid-barrel valve was in its minimum-open position, the back pressure valve was 35% open, and the extruder specific mechanical energy was 16.8 kwhr/ton.

In Run 2, the incoming slurry temperature was 88.6° C., the mid-barrel valve was in its full-open position, the back pressure valve was 25% open, and the extruder specific mechanical energy was 46.1 kwhr/ton, the pressure in the cone head was 100 psi, and the die pressure was 95 psi.

In Run 3, the incoming slurry temperature was 38.2° C., the mid-barrel valve was closed by 4 turns, and the extruder specific mechanical energy was 20.9 kwhr/ton.

In Run 4, the slurry was added to the preconditioner and to the extruder, and the back pressure valve was 30% open. The total Dry Ingredient Recipe added to the preconditioner during the run was 500 kg; the total amount of meat slurry added to the preconditioner was 1000 kg; and the total amount of meat slurry added to the extruder was 200 kg, making a total meat slurry to dry ingredient ratio 2.4 to 1. In the pre-dryer, product was dried for 0.8 minutes in the first pass, 2.0 minutes in the second pass, and 3.0 minutes in the third pass; the pre-dryer temperature was 130° C.

We claim:
1. A method of preparing a food or feed ingredient for incorporation into a human food or animal feed, said method comprising the steps of:
  extruding an extrudable mixture comprising dry fraction and a byproduct slurry fraction from a twin-screw extruder to create a wet extrudate having a moisture content of from about 38-50% by weight, based upon the total weight of the extrudate taken as 100% by weight, and thereafter drying the wet extrudate to give said food or feed ingredient, said extruding step comprising the steps of first directing at least a portion of said dry fraction and at least a portion of said byproduct slurry fraction together through a preconditioner, and then forming said extrudable mixture in said twin-screw extruder, said dry fraction portion including one or more ingredients selected from the group consisting of a source of plant-derived starch, a source of plant-derived protein, a source of animal-derived functional protein, and mixtures thereof, said byproduct slurry fraction portion selected from the group consisting of byproduct slurries from meat, poultry, dairy, vegetable, and fruit processing, and mixtures thereof, said byproduct slurry fraction being an aqueous blend comprising byproduct solids and from about 40-95% by weight water, the dry fraction and the slurry fraction comprising an extrudable mixture within said twin-screw extruder, said extrudable mixture containing from about 70-215% by weight of said slurry fraction, where the total weight of the dry fraction is taken as 100% by weight.

2. The method of claim 1, said dry fraction containing a source of plant-derived starch and a source of plant-derived protein.

3. The method of claim 2, said source of plant-derived starch selected from the group consisting of sources of potato, corn, pea, bean, wheat, rice, oat, arrowroot, tapioca, sorghum, barley, rye, and yam starches, and mixtures thereof.

4. The method of claim 2, said source of plant-derived protein selected from the group consisting of sources of soy, legumes, nuts, mung bean, pumpkin, asparagus, cauliflower, spinach, broccoli, and quinoa, and mixtures thereof.

5. The method of claim 1, said byproduct slurry fraction being an aqueous blend having a solids content of from about 5-60% by weight, based upon the total weight of the slurry fraction taken as 100% by weight.

6. The method of claim 5, said byproduct slurry fraction containing byproducts derived from meat, poultry, dairy, vegetable, and fruit processing.

7. The method of claim 6, said byproduct slurry fraction selected from the group consisting of byproduct slurries of mechanically separated or deboned meats, poultry products, dairy products, vegetable products, fruit products, other animal byproducts, and mixtures thereof, said byproduct slurries of mechanically separated or deboned meats selected from the group consisting of byproduct slurries of poultry, beef, pork, fish, sheep, venison, and mixtures thereof, said vegetable byproduct slurries selected from the group consisting of byproduct slurries of potato, beet, corn, pea, bean, wheat, rice, oat, sorghum, barley, rye, yam, and mixtures thereof, said dairy byproduct slurries selected from the group consisting of byproduct slurries of milk, cream, eggs, and mixtures thereof, said fruit byproduct slurries selected from the group consisting of byproduct slurries of apple, apricot, avocado, banana, berries, cherry, cranberry, grape, grapefruit, lemon, lime, melons, citrus fruits, tomato, peach, pear, pineapple, plum, and mixtures thereof.

8. The method of claim 1, including the step of separately adding said dry fraction and said slurry fraction into said preconditioner.

9. The method of claim 1, including the step of adding another portion of said dry fraction and/or said slurry fraction into said extruder to form, with said preconditioned dry fraction portion and said byproduct slurry fraction portion, said extrudable mixture within the extruder.

10. The method of claim 1, including the step of processing said dry and slurry fraction portions within the preconditioner for a period of from about 30 seconds to about 6 minutes, at a temperature of from about 60-110° C.

11. The method of claim 1, the maximum temperature within said extruder being from about 70-180° C., and the maximum pressure therein being from about 340-6,000 kPa.

12. The method of claim 1, including the step of injecting steam into said preconditioner during passage of said dry fraction portion and said slurry fraction portion therethrough.

13. The method of claim 1, including the step of injecting steam into said extruder, and mixing the injected steam into said extrudable mixture.

14. The method of claim 1, the residence time of said extrudable mixture in said extruder being from about 5-60 seconds, the maximum temperature within said extruder being from about 80-140° C., and the maximum pressure being from about 2500-4200 kPa.

15. The method of claim 1, said wet extrudate having a density of from about 500-700 kg/m$^3$.

16. The method of claim 1, said drying step comprising the steps of pre-drying the wet extrudate in a pre-dryer in order to reduce the moisture content of the wet extrudate and to set the pre-dried extrudate, followed by final drying of the pre-dried extrudate to achieve a moisture level of from about 7-11% by weight, based upon the total weight of the extrudate taken as 100% by weight.

17. The method of claim 1, said extrudable mixture containing from about 85-200% by weight of said slurry fraction, where the total weight of the dry fraction is taken as 100% by weight.

18. The method of claim 1, including the step of forming said slurry fraction by adding water to dried byproduct solids.

19. A method of preparing a food or feed ingredient for incorporation into a human food or animal feed, said method comprising the steps of extruding an extrudable mixture from a twin-screw extruder to create an extrudate having a moisture content of from about 38-50% by weight, based upon the total weight of the extrudate taken as 100% by weight, said extrudable mixture comprising a dry fraction and a byproduct slurry fraction, said extrudable mixture comprising from about 70-215% by weight of said byproduct slurry fraction, where the total weight of the dry fraction is taken as 100% by weight, said dry fraction portion including one or more ingredients selected from the group consisting of a source of plant-derived starch, a source of plant-derived protein, a source of animal-derived functional protein, and mixtures thereof, said byproduct slurry fraction portion selected from the group consisting of byproduct slurries from meat, poultry, dairy, vegetable, and fruit processing, and mixtures thereof, said slurry fraction being an aqueous blend comprising byproduct solids and from about 40-95% by weight water.

20. The method of claim 19, including the step of preconditioning at least portions of said dry fraction and said byproduct slurry fraction prior to said extruding step.

* * * * *